US012579016B2

(12) United States Patent
Kim et al.

(10) Patent No.: US 12,579,016 B2
(45) Date of Patent: Mar. 17, 2026

(54) PROCESSOR AND METHOD OF DETECTING SOFT ERROR FROM PROCESSOR

(71) Applicant: SAMSUNG ELECTRONICS CO., LTD., Suwon-si (KR)

(72) Inventors: Taesun Kim, Suwon-si (KR); Jinhong Park, Suwon-si (KR); Hwisoo So, Seoul (KR); Kyoungwoo Lee, Seoul (KR); Jinhyo Jung, Seoul (KR)

(73) Assignees: UIF (UNIVERSITY-INDUSTRY FOUNDATION), YONSEI UNIVERSITY, Seoul (KR); Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 18/232,442

(22) Filed: Aug. 10, 2023

(65) Prior Publication Data

US 2024/0095113 A1 Mar. 21, 2024

(30) Foreign Application Priority Data

Sep. 16, 2022 (KR) ........................ 10-2022-0117447

(51) Int. Cl.
*G06F 11/00* (2006.01)
*G06F 9/38* (2018.01)
*G06F 11/07* (2006.01)

(52) U.S. Cl.
CPC ........ *G06F 11/0751* (2013.01); *G06F 9/3867* (2013.01)

(58) Field of Classification Search
CPC ............. G06F 11/0751; G06F 11/1608; G06F 11/1629; G06F 11/1637; G06F 11/1645; G06F 11/277; G06F 11/0772
See application file for complete search history.

(56) References Cited

U.S. PATENT DOCUMENTS 7,512,772 B2    3/2009  Gschwind et al.
8,090,996 B2    1/2012  Vera et al.
(Continued)

FOREIGN PATENT DOCUMENTS

GB          2565338       2/2019

OTHER PUBLICATIONS

Extended European Search Report in European Appln. No. 23193529. 7, mailed on Feb. 20, 2024, 12 pages.
(Continued)

*Primary Examiner* — Katherine Lin
(74) *Attorney, Agent, or Firm* — Fish & Richardson P.C.

(57) ABSTRACT

A processor includes an instruction pipeline that sequentially processes an original instruction and a duplicate instruction, which is generated by duplicating the original instruction. An original register file stores a result obtained by processing the original instruction in the instruction pipeline within a register of a $n^{th}$ index thereof. A duplicate register file stores a result obtained by processing the duplicate instruction in the instruction pipeline within a register of a $n^{th}$ index thereof. A comparing unit compares the register of the $n^{th}$ index in the original register file with the register of $n^{th}$ index in the duplicate register file and outputs an error detection signal, in response to a control signal.

20 Claims, 14 Drawing Sheets

(56)  References Cited

U.S. PATENT DOCUMENTS

| | | | |
|---|---|---|---|
| 8,140,893 B2 | 3/2012 | Niino | |
| 9,195,553 B2 | 11/2015 | Takemori | |
| 10,248,488 B2 | 4/2019 | Ould-Ahmed-Vall et al. | |
| 10,621,022 B2 | 4/2020 | Sullivan et al. | |
| 2005/0138478 A1 | 6/2005 | Safford et al. | |
| 2017/0337047 A1 | 11/2017 | Shrivastava et al. | |
| 2019/0340054 A1 | 11/2019 | Boettcher et al. | |
| 2022/0318085 A1* | 10/2022 | Alsop ................... | G06F 9/3838 |

OTHER PUBLICATIONS

Lai et al., "Ditto processor", Proceedings of the International Conference on Dependable Systems and Networks (DSN'02), 2002, 10 pages.

Raab et al., "Reliability of Task Execution During Safe Software Processing", 2012 15th Euromicro Conference on Digital System Design (DSD), Sep. 2012, pp. 84-89.

Rotenberg, "AR-SMT: A Microarchitectural Approach to Fault Tolerance in Microprocessors", Digest of Papers. Twenty-Ninth Annual International Symposium on Fault-Tolerant Computing (Cat. No. 99CB36352), Jun. 1999, 8 pages.

* cited by examiner

| Cycle | OFU | DFU | DU | EU | WU |
|---|---|---|---|---|---|
| 1 | INS1 | | | | |
| 2 | INS2 | INS1' | INS1 | | |
| 3 | INS2 | INS2' | INS1' | INS1 | |
| 4 | | INS2' | INS2 | INS1' | INS1 |
| 5 | | | INS2' | INS2 | INS1' |

| Instruction Address | Instruction |
|---|---|
| 0x0000 | INS1  : ADD, R0, R1, R2<br>INS1' : ADD', R0', R1', R2' |
| 0x0004 | INS2  : R1 = 0x0100<br>INS2' : R1' = 0x0100 |
| 0x0008 | INS3  : STR R0  → [R1]<br>INS3' : LDR R0' ← [R1'] |

FIG. 14

| Cycle | OFU | DFU | DU | EU | MU | WU | OPC | DPC | Comparing |
|-------|-----|-----|-----|-----|-----|-----|-----|-----|-----------|
| 1 | INS1 | | | | | | 0x0000 → 0x0004 | 0x0000 | |
| 2 | INS2 | INS1' | R1, R2 | | | | 0x0004 | 0x0000 → 0x0004 | |
| 3 | INS2 | INS2' | R1', R2' | INS1 | | | 0x0004 → 0x0008 | 0x0004 | |
| 4 | INS3 | INS2' | INS2 | INS1' | INS1 | | 0x0008 | 0x0004 → 0x0008 | |
| 5 | INS3 | INS3' | INS2' | INS2 | INS1' | R0 | | | |
| 6 | | INS3' | R1 | INS2' | INS2 | R0' | | | |
| 7 | | | R1' | INS3 | INS2' | R1 | | | OPC = DPC ? |
| 8 | | | | INS3' | INS3 | R1' | | | |
| 9 | | | | | INS3' | INS3 | | | OPC = DPC ? |
| 10 | | | | | | R0 | | | |
| 11 | | | | | | | | | R0 = R0' ? |

FIG. 15

PROCESSOR AND METHOD OF DETECTING SOFT ERROR FROM PROCESSOR

CROSS-REFERENCE TO RELATED PATENT APPLICATION

A claim of priority is made to Korean Patent Application No. 10-2022-0117447, filed on Sep. 16, 2022, in the Korean Intellectual Property Office, the disclosure of which is incorporated herein in its entirety by reference.

BACKGROUND

The disclosure relates to error detection from a processor and, more particularly, to a processor and a method of detecting a soft error from the processor.

A soft error (or transient fault) generally refers to an error in which a bit value stored in a semiconductor device, such as a transistor, is reversed from "0" to "1" or vice versa as the result of transient factors, for example, collision between neutrons or alpha particles. Soft errors are the result of temporary malfunctions, as opposed to hard errors caused by permanent hardware faults. Inaccurate bit values resulting from soft errors may result in fatal processing errors during operation of a processor. As a result, a demand exists to economically utilize processor resources for accurate detection of soft errors prior to a fatal processor malfunction.

SUMMARY

According to an aspect of the present disclosure, there is provided a processor including an instruction pipeline which sequentially processes an original instruction and a duplicate instruction generated by duplicating the original instruction. An original register file stores the result obtained by processing the original instruction from the instruction pipeline in a register of an $n^{th}$ index thereof. A duplicate register file stores the result obtained by processing the duplicate instruction from the instruction pipeline in a register of an $n^{th}$ index thereof. A comparing unit compares the register of the $n^{th}$ index in the original register file with the register of the $n^{th}$ index in the duplicate register file and outputs an error detection signal, in response to a control signal.

According to another aspect of the present disclosure, there is provided a method of detecting a soft error including: executing an original instruction through an instruction pipeline; storing the execution result of the original instruction in a register of $n^{th}$ index of an original register file; duplicating the original instruction to a duplicate instruction; executing the duplicate instruction through the instruction pipeline; storing the execution result of the duplicate instruction in a register of an $n^{th}$ index of a duplicate register file; and comparing the register of the $n^{th}$ index of the original register file with the register of the $n^{th}$ index of the duplicate register file.

According to another aspect of the present disclosure, there is provided a processor including at least two cores. Each of the at least two cores includes: an instruction pipeline including a plurality of stages where an original instruction is processed in $x^{th}$ instruction cycles and a duplicate instruction is processed in $x^{th}+1$ instruction cycles; an original register file which includes a plurality of registers and temporarily stores the execution result of the instruction pipeline with respect to the original instruction; an original program counter which is changed at the $x^{th}$ instruction cycle and maintained at the $x^{th}+1$ instruction cycle; a duplicate register file which includes the number of registers that is same as that of registers in the original register file and temporarily stores the execution result of the instruction pipeline with respect to the duplicate instruction; a duplicate program counter which is changed at the $x^{th}+1$ instruction cycle and maintained at an $x^{th}+2$ instruction cycle; and a comparing unit which compares the registers of the same index in the original register file and the duplicate register file or the original program counter with the duplicate program counter and outputs an error detection signal.

BRIEF DESCRIPTION OF THE DRAWINGS

The above and other features and advantages of the present disclosure will become more apparent by describing in detail exemplary embodiments thereof with reference to the attached drawings in which:

FIGS. 14 and 15 are diagrams for reference in describing an operation of detecting a soft error from a processor with respect to each specific instruction according to an embodiment of the present disclosure.

DETAILED DESCRIPTION

Hereinafter, embodiments of the present disclosure are described in detail and with such clarity as to allow a person of ordinary skill in the art to make and use the disclosure as claimed herein without undue experimentation.

Figure 1:
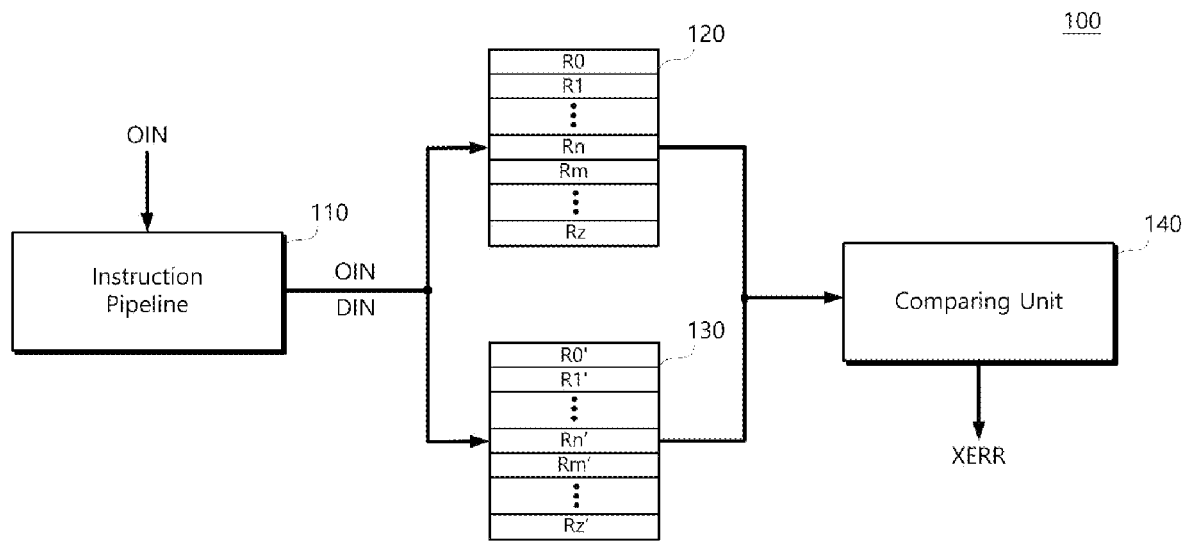
FIG. 1 illustrates a processor according to an embodiment of the present disclosure.
Figure 2:
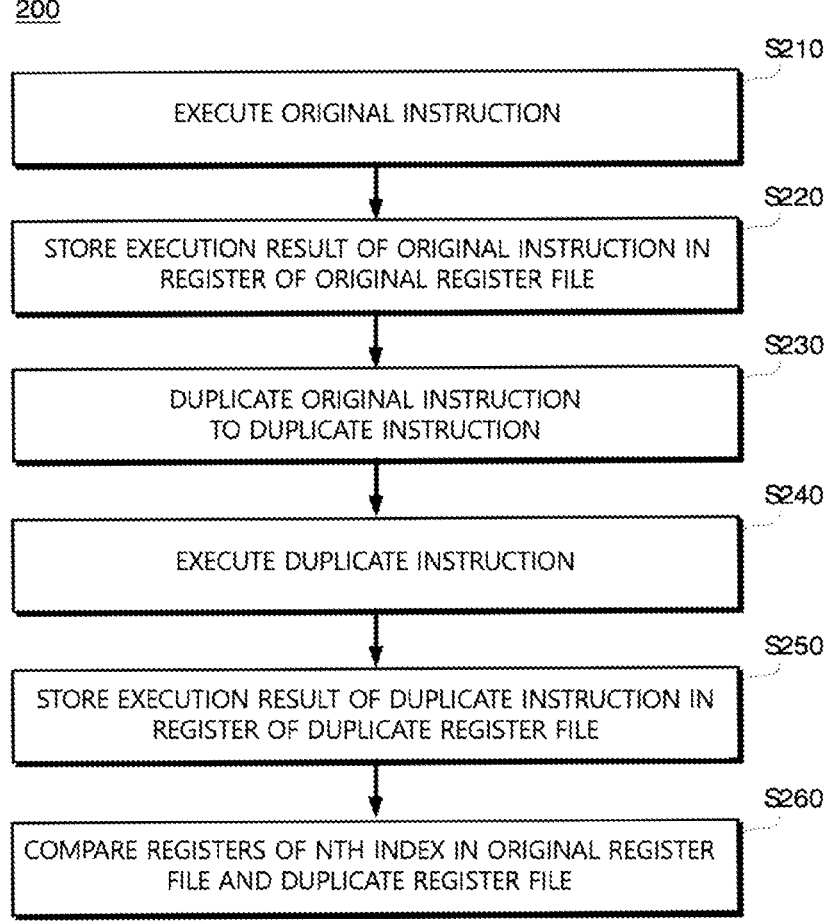
FIG. 2 is a flowchart illustrating a method of detecting a soft error from a processor according to an embodiment of the present disclosure.

FIG. 1 illustrates soft error detection resources of a processor 100 according to an embodiment of the present disclosure, and FIG. 2 is a flowchart illustrating a method 200 of detecting a soft error from the processor 100 according to an embodiment of the present disclosure.

Referring to FIGS. 1 and 2, the processor 100 according to an embodiment of the present disclosure includes an instruction pipeline 110, an original register file 120, a duplicate register file 130, and a comparing unit 140. In this example, the original register file 120 includes registers R0 to Rz (where z is a positive integer) of $0^{th}$ to $z^{th}$ indices and the duplicate register file 130 includes registers R0' to Rz' (where z' is a positive integer) of $0'^{th}$ to $z'^{th}$ indices. Here, z may be equal to z'. As an aside, note here that the resources used to detect soft errors are relatively minimal, which allows for implementation of a relatively simple soft error detection process.

The method 200 of detecting a soft error from the processor 100 according to an embodiment of the present disclosure includes executing an original instruction in operation S210, storing the execution result of the original instruction in a register of an $n^{th}$ index of the original register file 120 in operation S220, duplicating the original instruction to a duplicate instruction in operation S230, executing the duplicate instruction in operation S240, storing the execution result of the duplicate instruction in a register of the $n^{th}$ index of the duplicate register file 130 in operation S250, and comparing the register of the $n^{th}$ index of the original register file 120 with the register of the $n^{th}$ index of the duplicate register file 130 in operation S260.

The processor 100 of FIG. 1 according to an embodiment of the present disclosure may detect a soft error by using the method 200 of FIG. 2 for detecting a soft error according to an embodiment of the present disclosure. Also, the method 200 of detecting a soft error according to an embodiment of the present disclosure may be performed in the processor 100 according to an embodiment of the present disclosure. However, the present disclosure is not limited thereto and the processor 100 according to an embodiment of the present disclosure may detect a soft error by using a method that is different from the method 200. In addition, the method 200 of detecting a soft error according to an embodiment of the present disclosure may be performed in a processor that is different from the processor 100. Hereinafter, for convenience of description, it is illustrated that the processor 100 according to an embodiment of the present disclosure detects a soft error by using the method 200 of detecting a soft error and the method 200 of detecting a soft error according to an embodiment of the present disclosure is performed in the processor 100.

Referring still to FIGS. 1 and 2, the instruction pipeline 110 included in the processor 100 according to an embodiment of the present disclosure sequentially processes an original instruction OIN in operation S210.

The instruction pipeline 110 sequentially processes a duplicate instruction DIN, which corresponds to the original instruction OIN, in operation S240. For example, the duplicate instruction DIN is generated by duplicating the original instruction OIN in operation S230. Various methods of generating the duplicate instruction DIN by duplicating the original instruction OIN according to an embodiment of the present disclosure will be described later.

The instruction pipeline 110 sequentially processes the original instruction OIN or the duplicate instruction DIN in such a way that total stages included in the instruction pipeline 110 required to execute the original instruction OIN or the duplicate instruction DIN are performed by being synchronized with an instruction cycle of the processor 100 and thereby, the execution result of the original instruction OIN or the duplicate instruction DIN is generated.

Figures 3, 4:
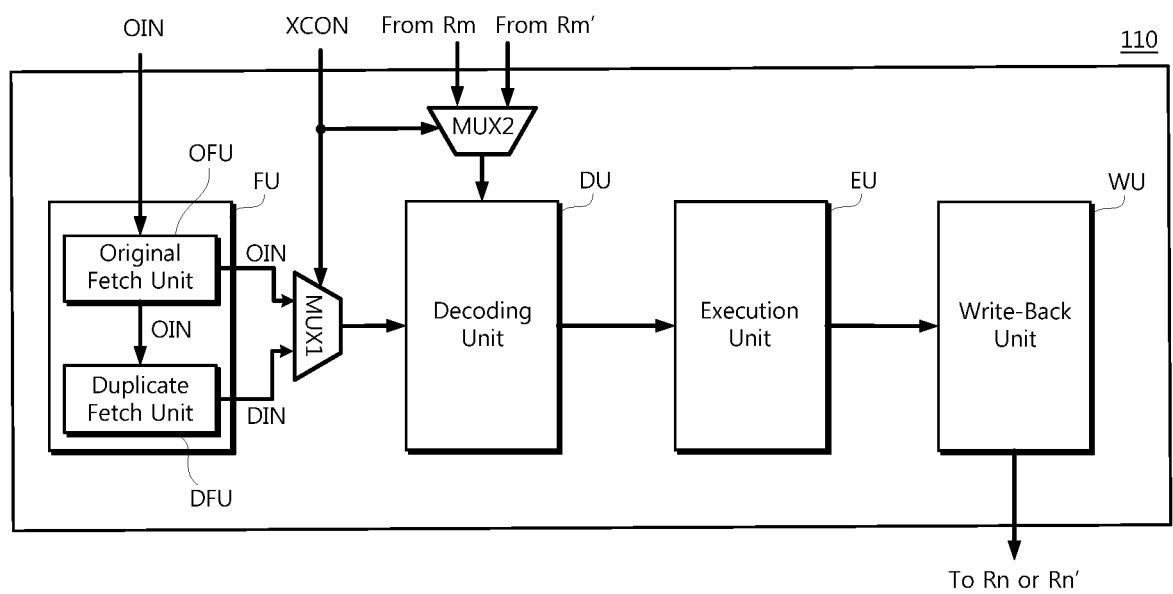
FIG. 3 illustrates an instruction pipeline according to an embodiment of the present disclosure.
FIG. 4 illustrates a table for reference in describing an operation of the instruction pipeline of FIG. 3.

FIG. 3 illustrates the instruction pipeline 110 according to an embodiment of the present disclosure, and FIG. 4 illustrates operation of the instruction pipeline 110 of FIG. 3.

Referring to FIGS. 1, 3, and 4, the instruction pipeline 110 according to an embodiment of the present disclosure may include a fetch unit FU, a decoding unit DU, an execution unit EU, and a write-back unit WU.

The fetch unit FU may fetch the original instruction OIN and the duplicate instruction DIN. The fetch unit FU may be realized as a queue by a first-in first-out (FIFO) buffer. The fetch unit FU may include an original fetch unit OFU and a duplicate fetch unit DFU, wherein the original fetch unit OFU fetches the original instruction OIN from the outside and the duplicate fetch unit DFU duplicates the original instruction OIN fetched to the original fetch unit to be stored as the duplicate instruction DIN. That is, the duplicate instruction DIN may be generated from the duplication of the original instruction OIN in the original fetch unit OFU.

In this case, when a first original instruction INS1 and a second original instruction INS2 are fetched to the original fetch unit OFU respectively in a first instruction cycle and a second instruction cycle, the first original instruction INS1 and the second original instruction INS2 may be fetched to the duplicate fetch unit DFU respectively in the second instruction cycle and a third instruction cycle.

The decoding unit DU may sequentially decode the original instruction OIN and the duplicate instruction. The decoding unit DU may parse an opcode of the original instruction OIN and the duplicate instruction DIN and may access registers indicated by an operand. For example, the decoding unit DU may decode the original instruction OIN to access a register Rm of an $m^{th}$ index of the original register file 120 and may decode the duplicate instruction DIN to access a register Rm' of an $m^{th}$ index of the duplicate register file 130.

Hereinafter, for convenience of description, the register of the original register file 120 may be referred to as an original register and the register of the duplicate register file 130 may be referred to as a duplicate register. Also, in understanding the present disclosure, reference to a register, an index of a register, or a register value may be mixed or used together unless unclarity does not occur.

The instruction pipeline 110 according to an embodiment of the present disclosure may further include a first multiplexer MUX1 and a second multiplexer MUX2 for the decoding unit DU to decode one of the original instruction OIN and the duplicate instruction DIN and to process one of the original register Rm and the duplicate register Rm'. The first multiplexer MUX1 and the second multiplexer MUX2 may respectively transmit one of the original instruction OIN and the duplicate instruction DIN and one of the original register Rm and the duplicate register Rm' to the decoding unit DU, in response to a control signal XCON.

The decoding operation for the first original instruction INS1 and the second original instruction INS2 may be respectively performed in the second instruction cycle and a fourth instruction cycle, and the decoding operation for a first duplicate instruction INS1' and a second duplicate instruction INS2' may be respectively performed in the third instruction cycle and a fifth instruction cycle.

The execution unit EU may perform an operation that corresponds to the decoding result from the decoding unit DU. For example, when an opcode of the original instruction OIN and the duplicate instruction DIN is "ADD" in which arbitrary two registers are added, the execution unit EU may output the result obtained by adding two registers through an arithmetic and logical unit ALU.

The write-back unit WU may write the execution result from the execution unit EU to the register Rn of an $n^{th}$ index of the original register file 120 and the register Rn' of an $n^{th}$ index of the duplicate register file 130. The first original instruction INS1 may be respectively processed by the execution unit EU and the write-back unit WU in the third instruction cycle and the fourth instruction cycle and may be written in the register Rn of an $n^{th}$ index of the original register file 120. The first duplicate instruction INS1' may be respectively processed by the execution unit EU and the write-back unit WU in the fourth instruction cycle and the fifth instruction cycle and may be written in the register Rn' of an $n^{th}$ index of the duplicate register file 130. The second original instruction INS2 and the second duplicate instruction INS2' may also be written in the corresponding registers through the same operation above.

As described above, the original instruction OIN and the duplicate instruction DIN are sequentially performed through the structure of the instruction pipeline 110 according to an embodiment of the present disclosure to minimize increases of hardware resources, power, and execution time for detecting a soft error.

Also, since the processor 100 according to an embodiment of the present disclosure includes the same register files for temporarily storing an operand required to execute the original instruction OIN and the duplicate instruction DIN or the execution result of the original instruction OIN and the duplicate instruction DIN, the process of detecting a soft error may be simplified as described below.

The original register file 120 may include a plurality of registers. The plurality of registers may each have the same size such as 32 bit or 64 bit. As described above, the result obtained by processing the original instruction OIN in the instruction pipeline 110 may be stored in the register of the original register file 120. For example, the result obtained by processing the first original instruction INS1 in the write-back unit WU may be stored in the register Rn of the $n^{th}$ index. Each register may be indicated as indices R0 through Rz.

The duplicate register file 130, in which an operand for the duplicate instruction DIN or the result of processing the duplicate instruction DIN is temporarily stored, may have the index set in the same manner as the index of the original register file 120. As illustrated in FIG. 1, when the indices of the original register file 120 are set to R0 through Rz, the indices of the duplicate register file 130 are also set to R0 through Rz. However, in the present disclosure, to distinguish the indices of the original register file 120 from the indices of the duplicate register file 130, the indices of the original register file 120 are indicated as R0 through Rz and the indices of the duplicate register file 130 are indicated as R0' through Rz'. Also, the size and number of the registers in the duplicate register file 130 may be the same as those of the registers in the original register file 120.

The result obtained by processing the duplicate instruction DIN in the instruction pipeline 110 is stored in the register of the index in the duplicate register file 130, wherein the index is the same as that of in the original register file 120 storing the result obtained by processing the original instruction OIN. As described above, when the result obtained by processing the first original instruction INS1 is stored in the register Rn of the $n^{th}$ index in the original register file 120, the result obtained by processing the first duplicate instruction INS1' that corresponds to the first original instruction INS1 may be stored in the Rn' of the $n^{th}$ index in the duplicate register file 130.

As the result obtained by processing an arbitrary instruction may be used as an operand of another instruction, the indices of the registers for storing the operand used to process the original instruction OIN and the operand used to process the duplicate instruction DIN may be the same. In the above example, the operands of the original instruction OIN and the duplicate instruction DIN may all be stored in the registers Rm and Rm' of the $m^{th}$ index.

The comparing unit 140 may compare the register Rn of the $n^{th}$ index in the original register file 120 with the register Rn' of the $n^{th}$ index in the duplicate register file 130 and output an error detection signal XERR, in response to the control signal XCON. For example, when the original register Rn and the duplicate register Rn' are the same, the error detection signal XERR is output as a logic low "L" to indicate that a soft error is not detected. On the other hand, when the original register Rn and the duplicate register Rn' are different from each other, the error detection signal XERR is output as a logic high "H" to indicate that a soft error is detected.

As described above, because the duplicate register file 130 is included separately from the original register file 120, the structure of the original register file 120 is the same as that of the duplicate register file 130, and the same indices are allocated for the original instruction OIN and the duplicate instruction DIN, the process may be simplified to detect a soft error which may occur in executing the original instruction OIN. Accordingly, resources, power, and time required to detect a soft error may be saved.

Figure 6:
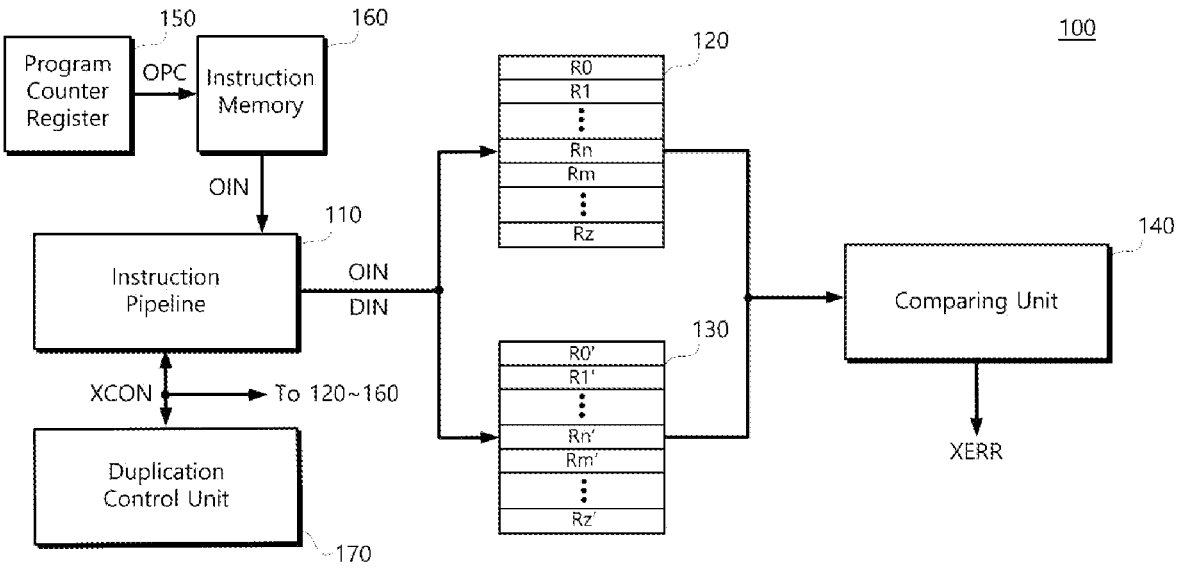
FIG. 6 illustrates a processor according to an embodiment of the present disclosure.

FIG. 6 illustrates the processor 100 according to an embodiment of the present disclosure.

Referring to FIG. 6, the processor 100 according to an embodiment of the present disclosure includes the instruction pipeline 110, the original register file 120, the duplicate register file 130, and the comparing unit 140 as in FIG. 1. In addition, the processor 100 of FIG. 6 may further include a program counter register 150, an instruction memory 160, and a duplication control unit 170.

The program counter register 150 may store an original program counter OPC which specifies the original instruction OIN to be executed. The original instruction OIN stored in an address of the instruction memory 160 may be fetched to the instruction pipeline 110, wherein the original instruction OIN corresponds to the original program counter OPC. After the original instruction OIN is fetched to the instruction pipeline 110, the original program counter OPC may have a changed value. For example, after the original instruction OIN is fetched to the instruction pipeline 110, the value of the original program counter OPC may increase by one from "0x0004" to "0x0008".

The duplication control unit 170 may generate the control signal XCON which controls generation and process of the duplicate instruction DIN to detect a soft error. For example, the duplication control unit 170 may identify the original instruction OIN fetched from the instruction memory 160 to the instruction pipeline 110 and control the corresponding duplicate instruction DIN to be duplicated according to a type of the original instruction OIN.

For example, the duplication control unit 170 may control the duplicate instruction DIN to be duplicated identically with the original instruction OIN.

Figure 5:
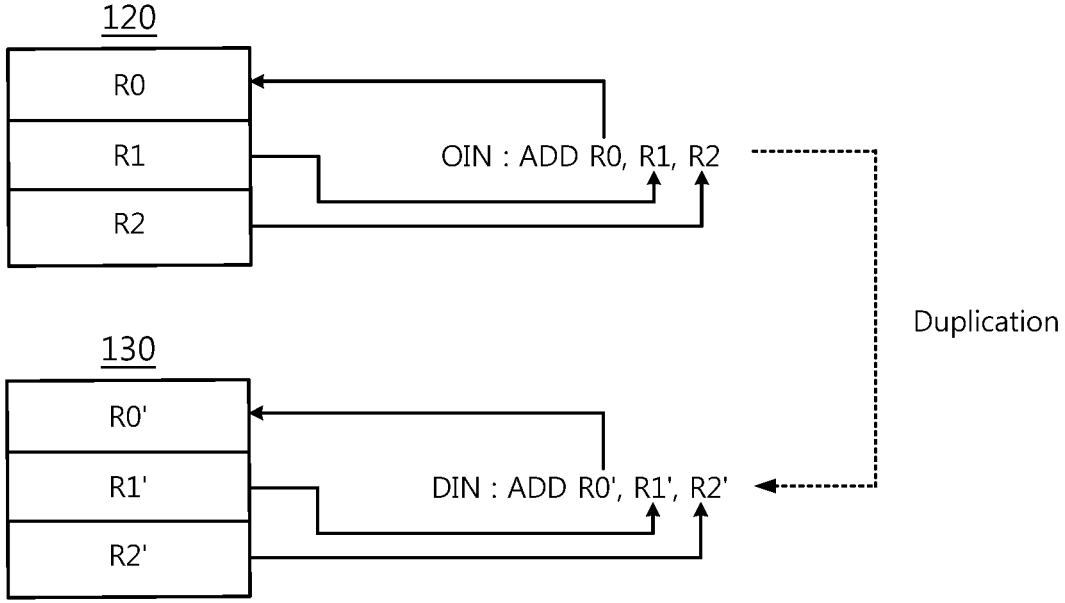
FIG. 5 illustrates a control operation of a duplicate control unit according to an embodiment of the present disclosure.

FIG. 5 illustrates control operation of the duplicate control unit 170 according to an embodiment of the present disclosure.

Referring to FIGS. 5 and 6, when the processor 100 is an ARM processor, the duplication control unit 170 according to an embodiment of the present disclosure may control the original instruction OIN "ADD R0, R1, R2" to be duplicated to the duplicate instruction DIN "ADD R0', R1', R2'", wherein the original instruction OIN "ADD R0, R1, R2" acquires the sum of the registers R1 and R2 for storage in the register R0 of the original register file 120 and the duplicate instruction DIN "ADD R0', R1', R2'" acquires the sum of the registers R1' and R2' for storage in the register R0' of the duplicate register file 130.

Referring back to FIG. 6, the duplication control unit 170 may control the duplicate instruction DIN to be duplicated to a type different from the original instruction OIN. For example, when the processor 100 is an ARM processor and when the original instruction OIN fetched to the instruction pipeline 110 is "STR", that is, an instruction commanding to store in a memory, the duplication control unit 170 may control the duplicate instruction DIN to be duplicated to "LDR", that is, an instruction commanding a load from a memory to a register. The example where the original instruction OIN is "STR" will be described in more detail below.

Also, the duplication control unit 170 may control the first and second multiplexers MUX1 and MUX2 in the instruction pipeline 110 of FIG. 3 and updating of the original register file 120 and the duplicate register file 130 or may generate the control signal XCON used to control comparative operation with an object to be compared in the comparing unit 140.

Figure 7:
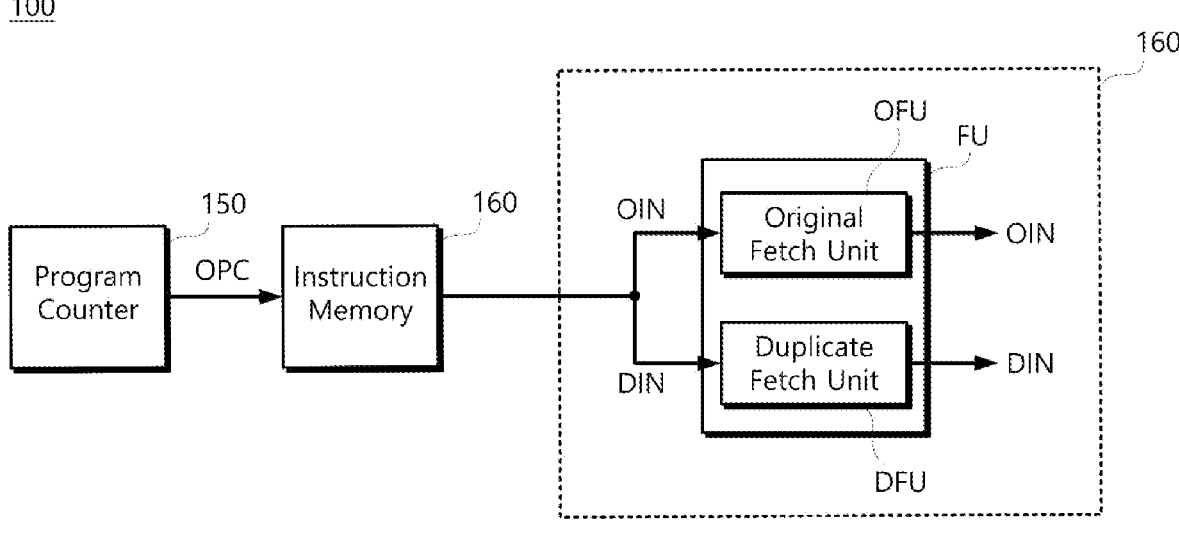
FIG. 7 illustrates a block diagram for reference in describing a method of duplicating an original instruction according to an embodiment of the present disclosure.

FIG. 7 illustrates a method of duplicating an original instruction according to an embodiment of the present disclosure.

Referring to FIG. 7, the original instruction OIN, which corresponds to the original program counter OPC, may be fetched to the original fetch unit OFU from the instruction memory 160. The original instruction OIN, which corresponds to the original program counter OPC, may be fetched as the duplicate instruction DIN to the duplicate fetch unit DFU from the instruction memory 160. As described above, the processor 100 according to an embodiment of the present disclosure may duplicate the original instruction OIN using various methods according to required conditions and circumstances so that flexibility of control may be improved in detecting a soft error.

As above, it is described that the original register file 120 is duplicated to detect a soft error with respect to a data flow in the processor 100 according to an embodiment of the present disclosure. Hereinafter, detection of a soft error with respect to a control flow in the processor 100 or detection of a soft error using idle resources in an executing stage instead of a final result will be described.

Figure 8:
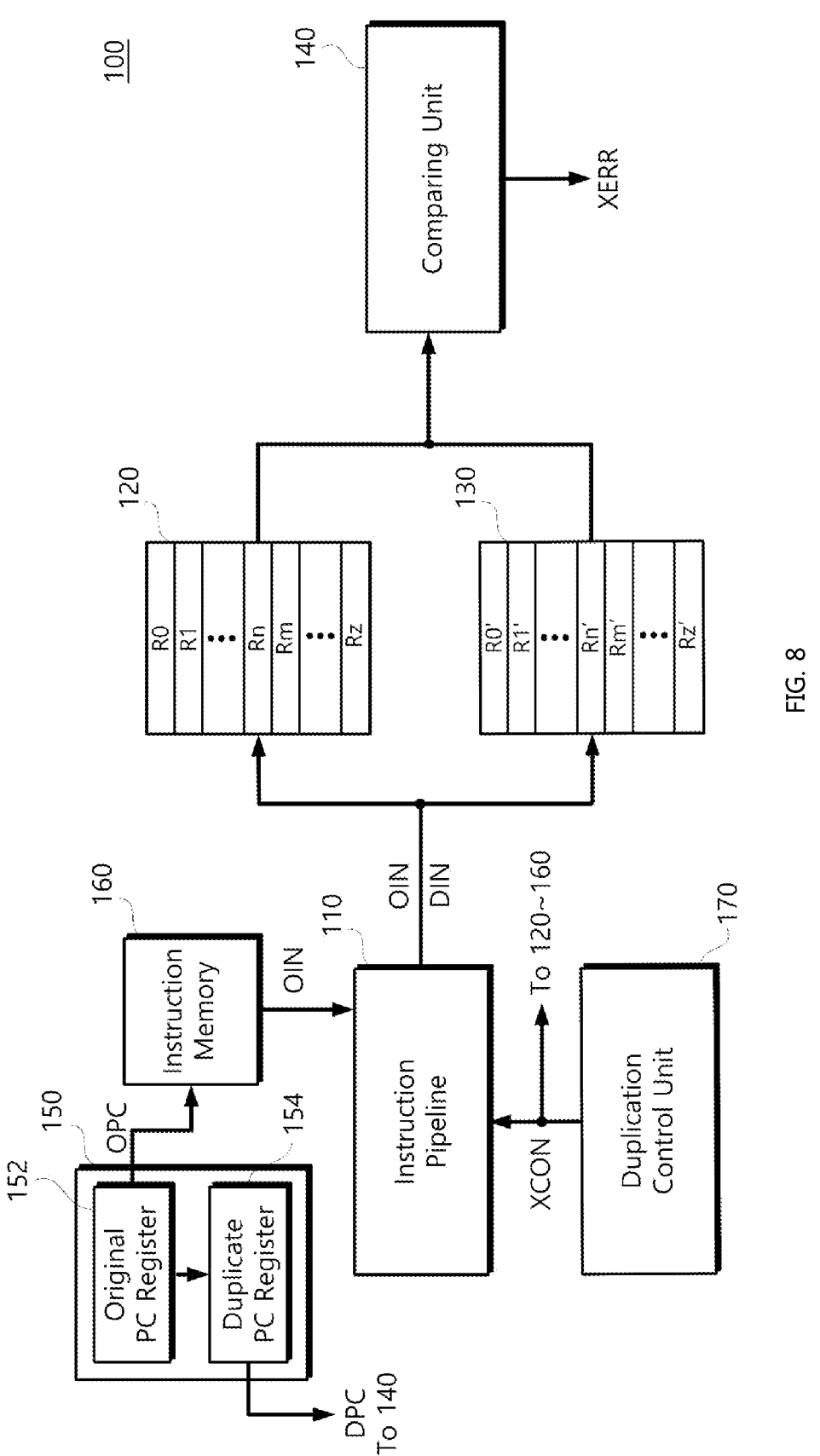
FIG. 8 illustrates a processor for detecting a soft error by duplicating a program counter according to an embodiment of the present disclosure.

FIG. 8 illustrates the processor 100 for detecting a soft error by duplicating a program counter according to an embodiment of the present disclosure.

Referring to FIG. 8, the processor 100 according to an embodiment of the present disclosure may include the instruction pipeline 110, the original register file 120, the duplicate register file 130, the comparing unit 140, the program counter register 150, the instruction memory 160, and the duplication control unit 170 as in FIG. 6. In addition, the program counter register 150 may include an original program counter register 152 and a duplicate program counter register 154.

As described above, the original program counter register 152 may store the original program counter OPC that corresponds to the original instruction OIN. The duplicate program counter register 154 may store a duplicate program counter DPC that corresponds to the duplicate instruction DIN.

The duplicate program counter DPC may be stored by duplicating the original program counter OPC in the first instruction cycle for the original instruction OIN. After the first instruction cycle, the duplicate program counter DPC may be changed while the duplicate instruction DIN is processed by the instruction pipeline 110. For example, the duplicate program counter DPC may be changed after the duplicate instruction DIN is fetched in the instruction pipeline 110.

Here, in response to the control signal XCON, the comparing unit 140 may compare the original program counter OPC with the duplicate program counter DPC and output the error detection signal XERR.

When the original program counter OPC and the duplicate program counter DPC are the same, the comparing unit 140 outputs the error detection signal XERR as a logic low "L" to indicate that a soft error is not detected. Also, when the original program counter OPC and the duplicate program counter DPC are different from each other, the comparing unit 140 outputs the error detection signal XERR as a logic high "H" to indicate that a soft error is detected.

There may be two cases where a soft error occurs while executing the original instruction OIN so that the original program counter OPC and the duplicate program counter DPC are different from each other. The first case is when an error exists in the original program counter OPC itself and, thereby, an instruction stored in another address of the instruction memory 160 is executed wrongly, instead of an instruction to be executed. In particular, when a program counter is changed to an arbitrary address value that corresponds to an execution result of an instruction such as a "JMP" (jump) instruction or a "BEQ" (branch) instruction of an ARM processor, the probability that an error occurs in the program counter may be high. The second case is when the original program counter OPC is normal, but an error exists in executing the original instruction OIN that corresponds to the original program counter OPC.

Figure 9:
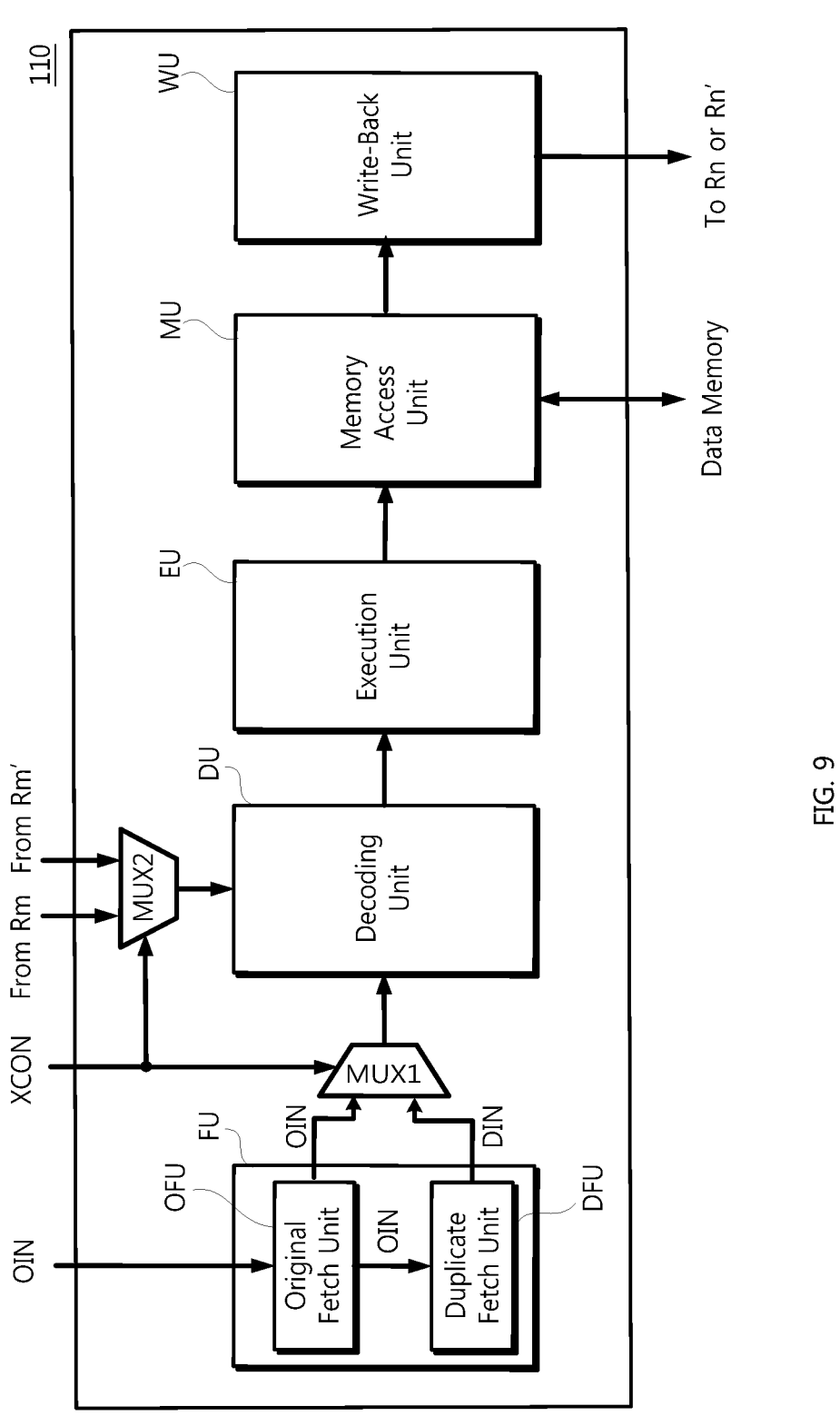
FIG. 9 illustrates an instruction pipeline according to an embodiment of the present disclosure.

FIG. 9 illustrates the instruction pipeline 110 according to an embodiment of the present disclosure.

Referring to FIGS. 6 and 9, the instruction pipeline 110 according to an embodiment of the present disclosure includes the fetch unit FU, the decoding unit DU, the execution unit EU, and the write-back unit WU as in FIG. 3 and may further include a memory access unit MU for transmitting data to a data memory disposed outside of the processor 100 or receiving data from the data memory. For example, when the original instruction OIN is a store instruction "STR", data stored in an arbitrary register of the original register file 120 may be transmitted to the data memory through the memory access unit MU. On the other hand, when the original instruction OIN is a load instruction "LDR", data may be loaded to an arbitrary register of the original register file 120 from the data memory through the memory access unit MU.

Figure 10:
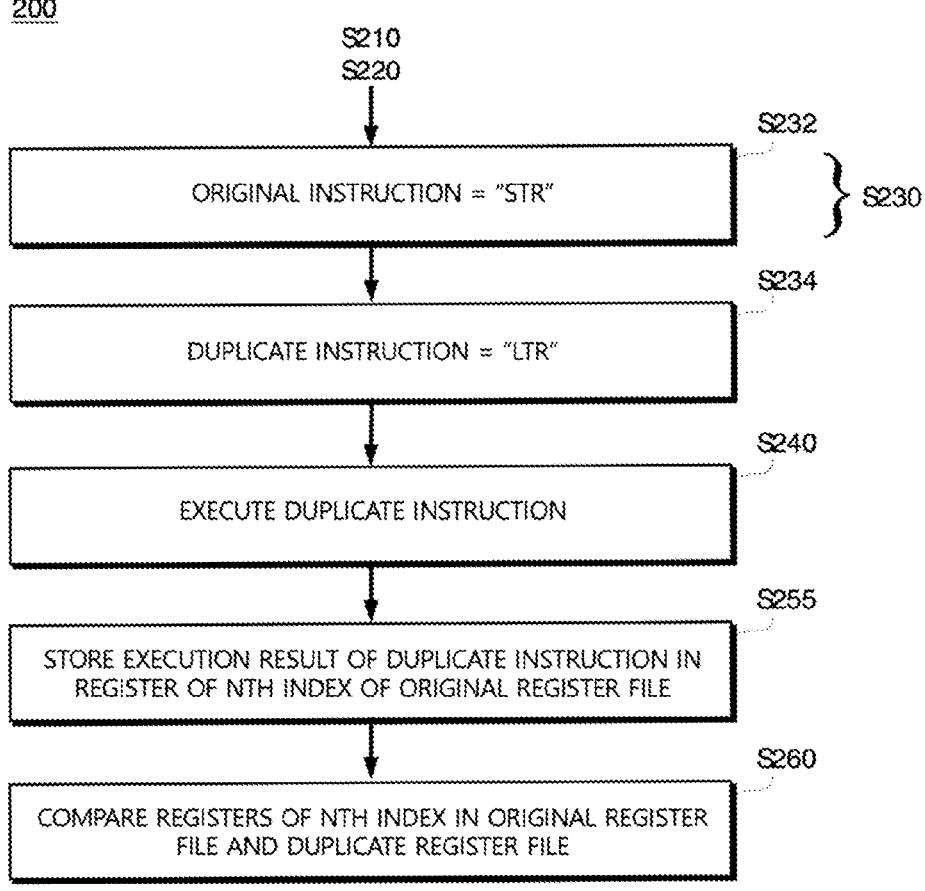
FIGS. 10 and 11 illustrate diagrams for reference in describing a method of detecting a soft error with respect to a store instruction according to an embodiment of the present disclosure.
Figure 11:
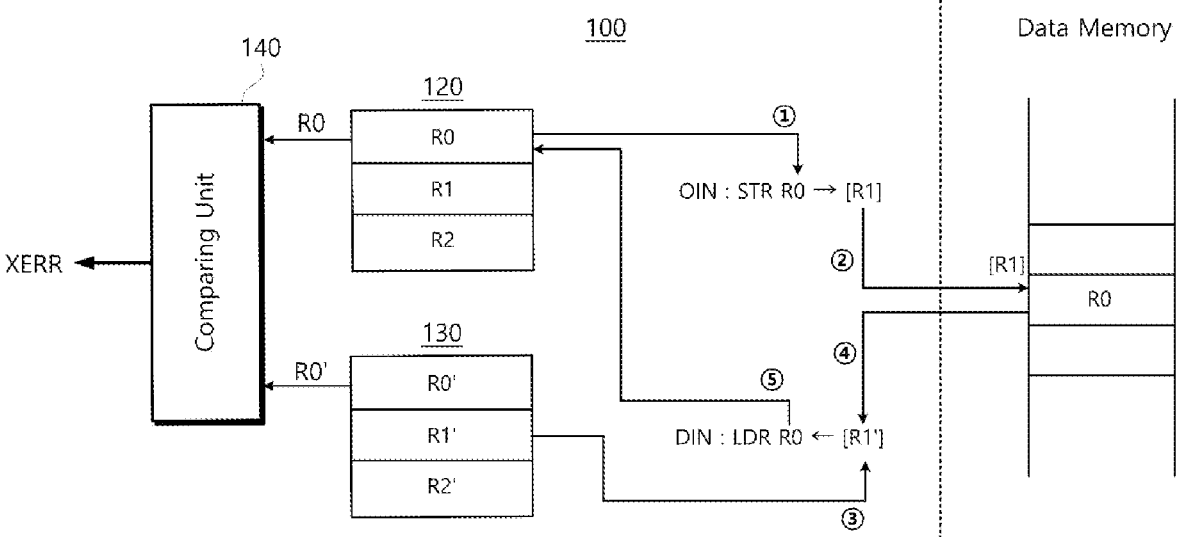

FIGS. 10 and 11 illustrate the method 200 of detecting a soft error with respect to the store instruction according to an embodiment of the present disclosure.

First, referring to FIGS. 8 and 10, in detecting of a soft error according to the store instruction, similar to the case of the original instruction OIN, instead of the store instruction "STR", the method 200 of detecting a soft error according to an embodiment of the present disclosure includes executing the original instruction OIN in operation S210 and storing the execution result of the original instruction OIN in the register Rn of the $n^{th}$ index of the original register file 120 in operation S220.

In addition, when the original instruction OIN is the store instruction "STR" in operation S232, the duplication control unit 170 may set the duplicate instruction DIN as the load instruction "LDR" in operation S234 and may duplicate the original instruction OIN to the duplicate instruction DIN in operation S230.

When the duplicate instruction DIN is the load instruction "LDR", the duplicate instruction DIN is executed in operation S240 and, then, the execution result of the duplicate instruction DIN may be stored in the register Rn of the $n^{th}$ index of the original register file 120, instead of the register Rn' of the $n^{th}$ index of the duplicate register file 130, in operation S255.

Similar to other instruction, the comparing unit 140 may compare the register Rn of the $n^{th}$ index of the original register file 120 with the register Rn' of the $n^{th}$ index of the duplicate register file 130 and may output the error detection signal XERR, in operation S260.

Next, referring to FIGS. 10 and 11, when the processor 100 according to an embodiment of the present disclosure is an ARM processor, while in executing the original instruction OIN "STR R0→[R1]" in operation S210, the register R0 of the original register file 120 is accessed ① and is stored in the address [R1] of the data memory ②. The address [R1] is a value stored in the register R1 of the original register file 120. Here, according to the execution of the original instruction OIN "STR R0→[R1]", the value of the register R0 in the original register file 120 is maintained in operation S220.

Next, the duplicate instruction DIN "LDR R0←[R1]" is duplicated with respect to the original instruction OIN "STR R0→[R1]" in operation S234. Then, the register R1' of the duplicate register file 130 is accessed ③ and data R0 stored in the address [R1'] of the data memory is transmitted to the processor 100 ④ in operation S240. The data R0 transmitted to the processor 100 is stored in the register R0 of the original register file 120 ⑤ through the memory access unit MU and the write-back unit WU of the instruction pipeline 110 in FIG. 7 in operation S255.

Here, the execution result of the duplicate instruction is stored in the register R0' of the duplicate register file 130, wherein the duplicate instruction corresponds to the original instruction executed before the original instruction OIN "STR R0←[R1]" is executed. The value that is same as the register R0 of the original register file 120 may be stored in the register R0' of the duplicate register file 130.

In this regard, the comparing unit 140 may compare the register R0 of the original register file 120, which is the execution result of the duplicate instruction DIN "LDR R0←[R1']", with the register R0' of the duplicate register file 130, which corresponds to the execution result of the original instruction OIN "STR R0←[R1]" in operation S260 and may output the error detection signal XERR.

In cases where a soft error occurs in executing the store instruction "SRT", thereby, 1) when wrong data is stored in a normal data memory area and 2) normal data is stored in a wrong address, the processor 100 and the method 200 of detecting a soft error according to an embodiment of the present disclosure may be used to simply and accurately detect a soft error. Assuming that an error does not exist in the register R0' of the duplicate register file 130, the register R0 of the original register file 120, which is compared by the comparing unit 140, may be damaged data in case 1) and the register R0 of the original register file 120, which is compared by the comparing unit 140, may be completely different data in case 2). Accordingly, the register R0' of the duplicate register file 130 and the register R0 of the original register file 120 are different from each other in both cases, the error detection signal XERR may be output as a logic high "H" from the comparing unit 140.

According to the processor 100 and the method 200 of detecting a soft error according to an embodiment of the present disclosure described above, both cases in which a soft error occurs and, thereby, the store instruction "SRT" is wrongly executed, may be simply and accurately detected.

Figure 12:
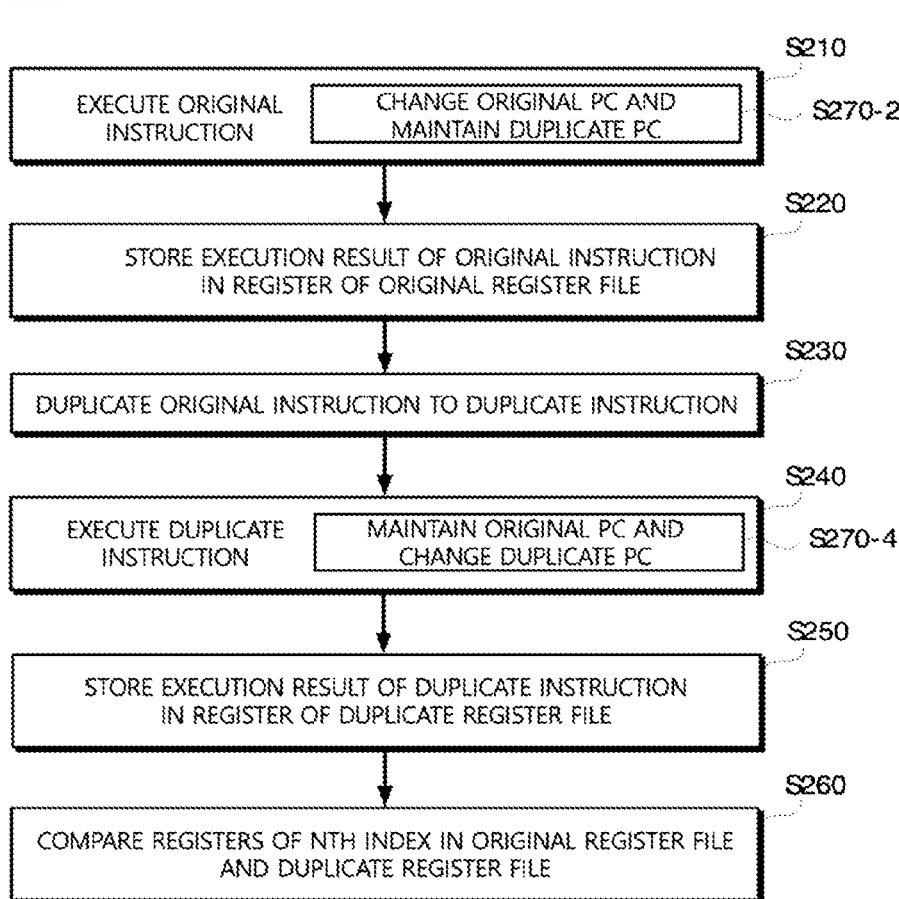
FIG. 12 is a flowchart illustrating a method of detecting a soft error to which control of program counters is applied according to an embodiment of the present disclosure.

FIG. 12 is a flowchart illustrating the method 200 of detecting a soft error to which control of the program counters is applied according to an embodiment of the present disclosure.

Referring to FIGS. 8 and 12, the method 200 of detecting a soft error according to an embodiment of the present disclosure includes executing the original instruction OIN in operation S210, storing the execution result of the original instruction OIN in the register Rn of the $n^{th}$ index of the original register file 120 in operation S220, duplicating the original instruction OIN to the duplicate instruction DIN in operation S230, executing the duplicate instruction DIN in operation S240, storing the execution result of the duplicate instruction DIN in the register Rn' of the $n^{th}$ index of the duplicate register file 130 in operation S250, and comparing the register Rn of the $n^{th}$ index of the original register file 120 with the register Rn' of the $n^{th}$ index of the duplicate register file 130 in operation S260, as in FIG. 2.

Here, according to the method 200 of detecting a soft error of FIG. 12, in order to control the original program counter OPC and the duplicate program counter DPC for executing the original instruction OIN and the duplicate instruction DIN, the original program counter OPC may be changed in two instruction cycles while executing the original instruction OIN in operation S210 and the duplicate program counter DPC may maintain in operation S270-2.

For example, in the first instruction cycle, the value of the original program counter OPC may be increased by one from "0x0000" to "0x0004" and the value of the duplicate program counter DPC may be maintained at "0x0000". Then, in the third instruction cycle, the value of the original program counter OPC may be increased by one from "0x0004" to "0x0008" and the value of the duplicate program counter DPC may be increased by one to "0x0004". For reference, in the first instruction cycle when the original instruction OIN is firstly executed, that is, when the original program counter OPC indicates "0x0000" which is a first address of the instruction memory 160, the duplicate program counter DPC may duplicate the original program counter OPC and may have the value of "0x0000".

Also, according to the method 200 of detecting a soft error of FIG. 12, to control the original program counter OPC and the duplicate program counter DPC for executing the original instruction OIN and the duplicate instruction DIN, the original program counter OPC may maintain in two instruction cycles while executing the duplicate instruction DIN in operation S240 and the duplicate program counter DPC may be changed in operation S270-4. For example, in an $n^{th}$ instruction cycle, the value of the duplicate program counter DPC may be increased by one from "0x0000" to "0x0004" and the value of the original program counter OPC may be maintained at "0x0000". Then, in the $n^{th}$+2 instruction cycle, the value of the original program counter OPC may be increased by one from "0x0000" to "0x0004" and the value of the duplicate program counter DPC may be increased by one from "0x0004" to "0x0008".

In the structure of the instruction pipeline 110 according to an embodiment of the present disclosure, the optimized control operation is performed for the program counter to sequentially execute the original instruction OIN and the duplicate instruction DIN so that increases of hardware resources, consumed power, and execution time required to detect a soft error may be minimized.

Figure 13:
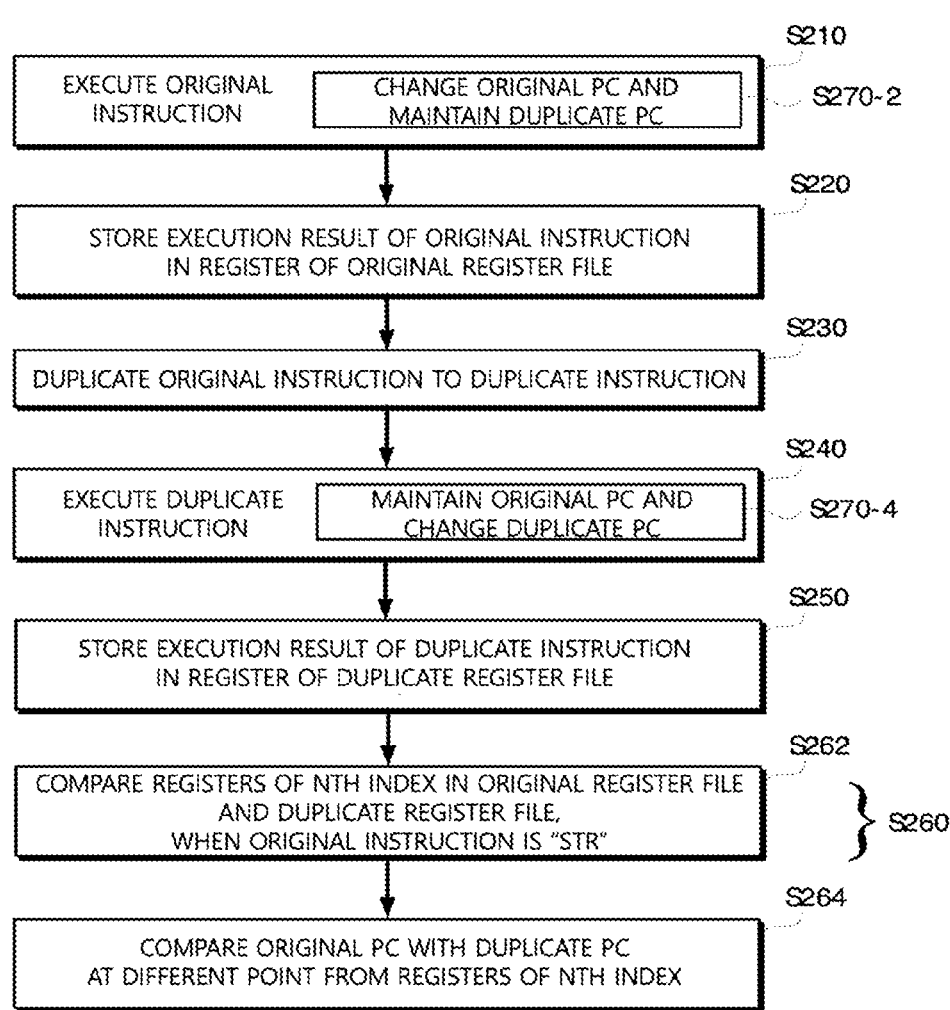
FIG. 13 is a flowchart illustrating a method of detecting a soft error to which control of error detection time is applied according to an embodiment of the present disclosure.

FIG. 13 is a flowchart illustrating a method of detecting a soft error to which control of error detection time is applied according to an embodiment of the present disclosure.

Referring to FIGS. 8 and 13, the method 200 of detecting a soft error according to an embodiment of the present disclosure may include comparing the register Rn of the $n^{th}$ index of the original register file 120 with the register Rn' of the $n^{th}$ index of the duplicate register file 130 in operation S262 performed by the comparing unit 140 to generate the error detection signal XERR, when the original instruction OIN is the store instruction "STR". The comparing unit 140 may perform the comparing operation in S262 at the time when the execution of the store instruction "STR" is completed. At what point the command execution is completed may be identified in such a way that the duplication control unit 170 receives information on the instruction from the write-back unit WU and then performs the related control operation at a final step of the instruction pipeline 110.

Also, the method 200 of detecting a soft error according to an embodiment of the present disclosure may include comparing the original program counter OPC with the duplicate program counter DPC in operation S264 performed at a point that is different from that of comparing the register Rn with the register Rn' of the $n^{th}$ index in operation S262.

As described above, the original instruction OIN and the duplicate instruction DIN are alternately executed so that the comparing unit 140 may compare the register values with the program counter values in every two instruction cycles to detect a soft error. However, the execution result of the original instruction OIN is temporarily stored in the original register file 120 and the final execution result of one original instruction OIN or a plurality of original instructions OIN may be the value or data transmitted to the data memory disposed outside the processor 100. In the processor 100 and the method 200 of detecting a soft error according to an embodiment of the present disclosure, comparing the register values is performed for the final execution result of the instruction and thus, power and time required to detect a soft error may be saved.

Also, in the processor 100 and the method 200 of detecting a soft error according to an embodiment of the present disclosure, along with comparing of the final execution result, the comparing unit 140 compares the original program counter OPC and the duplicate program counter DPC, in which resource allocation is not relatively great, in a cycle for which comparing of the register values is not performed to detect a soft error. Accordingly, accuracy of the detection may be improved. As described above, in addition to the soft error for the program counters, other soft error may be detected through comparing the original program counter OPC and the duplicate program counter DPC while executing instructions.

FIGS. 14 and 15 illustrate operation of detecting a soft error from the processor 100 with respect to each specific instruction according to an embodiment of the present disclosure.

Referring to FIGS. 8, 14, and 15, the first original instruction INS1 "ADD R0, R1, R2", the second original instruction INS2 "R1=0x0100", and a third original instruction INS3 "STR R0→[R1]" may be sequentially executed in the processor 100 according to an embodiment of the present disclosure. Here, the first original instruction INS1 through the third original instruction INS3 may be duplicated to the first duplicate instruction INS1' through a third duplicate instruction INS3' to be executed. That is, the first duplicate instruction INS1' "ADD R0', R1', R2'", the second duplicate instruction INS2' "R1'=0x0100", and the third duplicate instruction INS3' "LDR R0←[R1']" may be sequentially executed.

More specifically, the first original instruction INS1 may be fetched to the original fetch unit OFU in the first instruction cycle. Accordingly, the original program counter OPC is changed to indicate the next address "0x0004" and the duplicate program counter DPC may maintain "0x0000" which is the value of the original program counter OPC which is initially duplicated.

Next, the second original instruction INS2 and the first duplicate instruction INS1' may be respectively fetched to the original fetch unit OFU and the duplicate fetch unit DFU, respectively, in the second instruction cycle. Accordingly, the original program counter OPC may maintain the existing address "0x0004" and the duplicate program counter DPC may be changed to indicate the next address "0x0004".

In addition to this, the first original instruction INS1 may be decoded by the decoding unit DU and, thereby, the registers R1 and R2 of the original register file 120 may be accessed. For reference, FIG. 15 illustrates that the first duplicate instruction INS1' is fetched to the duplicate fetch unit DFU in the second instruction cycle; however, the first duplicate instruction INS1' and the first original instruction INS1 may be simultaneously fetched to the duplicate fetch unit DFU and the original fetch unit OFU, respectively, in the first instruction cycle.

In the third instruction cycle, the second original instruction INS2 may be held in the original fetch unit OFU and the second duplicate instruction INS2' may be fetched to the duplicate fetch unit DFU. Along with this, the first duplicate instruction INS1' may be decoded by the decoding unit DU and thereby, the registers R1' and R2' of the duplicate register file 130 may be accessed. The decoded first original instruction INS1 may be executed by the execution unit EU.

In a fourth instruction cycle, the third original instruction INS3 may be fetched to the original fetch unit OFU and the second duplicate instruction INS2' may be held to the duplicate fetch unit DFU. Along with this, the second original instruction INS2 may be decoded by the decoding unit DU and the first duplicate instruction INS1' may be executed by the execution unit EU. The first original instruction INS1, in which access to the data memory is not required, may be held by the memory access unit MU.

In a fifth instruction cycle, the third original instruction INS3 is held in the original fetch unit OFU and the third duplicate instruction INS3' may be fetched to the duplicate fetch unit DFU. Along with this, the second duplicate instruction INS2' may be decoded by the decoding unit DU and the second original instruction INS2 may be executed by the execution unit EU. The first duplicate instruction INS1', for which access to the data memory is not required, may be held by the memory access unit MU. The execution of the first original instruction INS1 is completed and thus, the sum of the registers R1 and R2 may be stored in the register R0 of the original register file 120 by the write-back unit WU.

In a sixth instruction cycle, the third duplicate instruction INS3' may be held in the duplicate fetch unit DFU. Along with this, the third original instruction INS3 may be decoded by the decoding unit DU and the second duplicate instruction INS2' may be executed by the execution unit EU. The second original instruction INS2, for which access to the data memory is not required, may be held by the memory access unit MU. The execution of the first duplicate instruction INS1' is completed and, thus, the sum of the registers R1' and R2' may be stored in the register R0' of the duplicate register file 130 by the write-back unit WU.

In a seventh instruction cycle, the third duplicate instruction INS3' may be decoded by the decoding unit DU and the third original instruction INS3 may be executed by the execution unit EU. Along with this, the second duplicate instruction INS2', for which access to the data memory is not required, may be held by the memory access unit MU. The execution of the second original instruction INS2 is completed and thus, "0x0100" may be stored in the register R1 of the original register file 120 by the write-back unit WU.

In the seventh instruction cycle, the comparing unit 140 may compare the original program counter OPC and the duplicate program counter DPC for the first original instruction INS1 and the first duplicate instruction INS1' for which each execution thereof is completed respectively in the fifth instruction cycle and the sixth instruction cycle and, thus, a soft error may be detected.

In an eighth instruction cycle, the third duplicate instruction INS3' may be executed by the execution unit EU. Along with this, the third original instruction INS3 may transmit data to the address stored in the register R1, wherein the data is stored in the register R0 of the original register file 120 and transmitted to the data memory through the memory access unit MU. The execution of the second duplicate instruction INS2' is completed and thus, "0x0100" may be stored in the register R1' of the duplicate register file 130 by the write-back unit WU.

In a ninth instruction cycle, the third duplicate instruction INS3' may receive data stored in the address of the register R1 in the duplicate register file 130 from the data memory through the memory access unit MU. Along with this, the execution of the third original instruction INS3 is completed and, thus, the value of the register R0 in the original register file 120 may be maintained by the write-back unit WU.

In the ninth instruction cycle, the comparing unit 140 may compare the original program counter OPC and the duplicate program counter DPC for the second original instruction INS2 and the second duplicate instruction INS2' in which each execution thereof is completed respectively in the seventh instruction cycle and the eighth instruction cycle and, thus, a soft error may be detected.

In a tenth instruction cycle, the execution of the third duplicate instruction INS3' is completed and, thus, data received from the data memory may be loaded to the register R0 of the original register file 120 by the write-back unit WU.

In an eleventh instruction cycle, the comparing unit 140 compares the register R0 of the original register file 120 with the register R0' of the duplicate register file 130 and, thus, a soft error may be detected.

Figure 16:
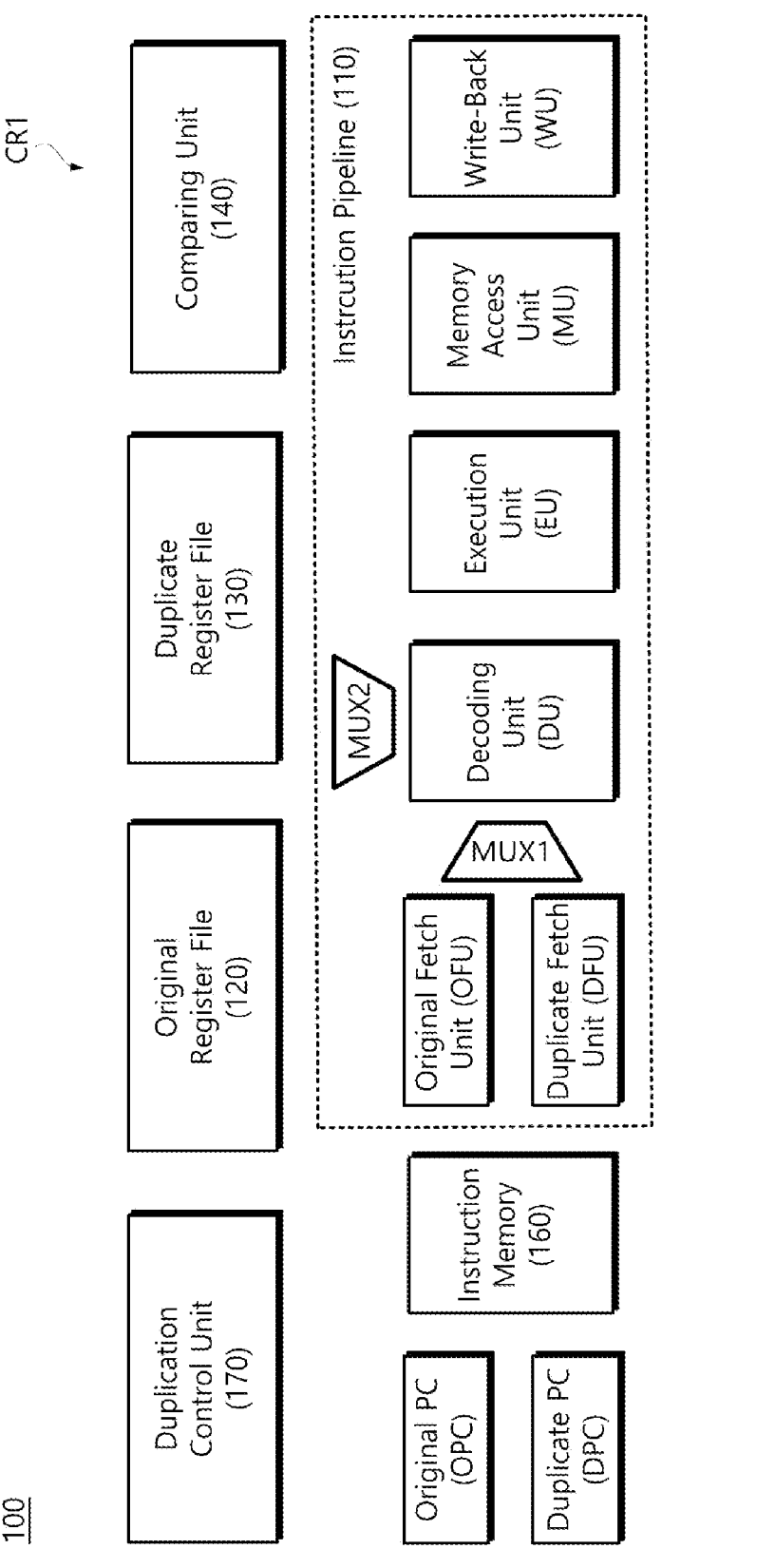
FIG. 16 illustrates a processor according to an embodiment of the present disclosure.

FIG. 16 illustrates the processor 100 according to an embodiment of the present disclosure.

Referring to FIGS. 1 and 16, the processor 100 according to an embodiment of the present disclosure may include at least two cores. At least one of the at least two cores may include the instruction pipeline 110, the original register file 120, the original program counter OPC, the duplicate register file 130, the duplicate program counter DPC, and the comparing unit 140 as in a first core CR1. The instruction pipeline 110 includes various stages where the original instruction OIN is processed in $x^{th}$ instruction cycles and the duplicate instruction DIN is processed in $x^{th}+1$ instruction cycles. The original register file 120 includes various registers and temporarily stores the execution result of the instruction pipeline 110 with respect to the original instruction OIN. The original program counter OPC is changed at the $x^{th}$ instruction cycle and maintained at the $x^{th}+1$ instruction cycle. The duplicate register file 130 includes the same number of registers as the original register file 120 and temporarily stores the execution result of the instruction pipeline 110 with respect to the duplicate instruction DIN. The duplicate program counter DPC is changed at the $x^{th}+1$ instruction cycle and maintained at an $x^{th}+2$ instruction cycle. The comparing unit 140 compares the registers of the same index in the original register file 120 and the duplicate register file 130 or the original program counter OPC with the duplicate program counter DPC and outputs the error detection signal XERR.

FIG. 16 does not illustrate the connection therebetween, however, it will be clearly understood by those of ordinary skill in the art with the description above.

According to an embodiment of the present disclosure, a core for detecting a soft error is not separately included in the processor and the method of detecting a soft error and, thus, resources may be saved. Also, the original register file for the original instruction and the duplicate register file for the duplicate instruction have the same structure and, thus, complexity of the processes required to detect a soft error may be reduced.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

Hereinafter, although representative embodiments of the present disclosure have been described in detail, those of ordinary skill in the art to which the present disclosure pertains will understand that various modifications are capable of being made to the above-described embodiments without departing from the scope the present disclosure. For example, the processor 100 according to an embodiment of the present disclosure is an ARM processor; however, the present disclosure is not limited thereto. Therefore, the scope of the present disclosure should not be limited to the described embodiments, but it should be defined by not only the claims described below, but also the claims and equivalents.

15

What is claimed is:

1. A processor comprising:
an instruction pipeline configured to process an original instruction and a duplicate instruction, the duplicate instruction being generated from the original instruction;
an original register file configured to store an original result in a register of an $n^{th}$ index of the original register file, where n is an integer;
a duplicate register file configured to store a duplicate result in a register of an $n^{th}$ index a register of the duplicate register file; and
a comparing unit configured to compare a first value of the register of the $n^{th}$ index of the original register file with a second value of the register of $n^{th}$ index of the duplicate register file to output an error detection signal, wherein the error detection signal is indicative of a presence of a soft error in execution of the original instruction,
wherein the instruction pipeline is configured to sequentially process (i) the original instruction to thereby obtain the original result and (ii) the duplicate instruction to thereby obtain the duplicate result.

2. The processor of claim 1, wherein the instruction pipeline comprises a multiplexer configured to receive the original instruction and the duplicate instruction.

3. The processor of claim 1, wherein a size and a number of registers included in the original register file are the same as a size and a number of registers in the duplicate register file.

4. The processor of claim 1, wherein the instruction pipeline comprises:
a fetch unit configured to fetch the original instruction and the duplicate instruction;
a decoding unit configured to sequentially decode the original instruction and the duplicate instruction of the fetch unit;
an execution unit configured to execute a decoding result obtained from the decoding unit; and
a write-back unit configured to write a first execution result obtained from the execution unit to the register of the $n^{th}$ index in the original register file and to write a second execution result obtained from the execution unit to the register of the $n^{th}$ index of the duplicate register file.

5. The processor of claim 4, wherein the fetch unit comprises:
an original fetch unit configured to fetch the original instruction, corresponding to a count value of an original program counter, from an instruction memory; and
a duplicate fetch unit configured to duplicate the original instruction, fetched to the original fetch unit, to be stored as the duplicate instruction.

6. The processor of claim 4, wherein the fetch unit comprises:
an original fetch unit configured to fetch the original instruction, corresponding to a count value of an original program counter, from an instruction memory; and
a duplicate fetch unit configured to fetch the original instruction from the instruction memory, to be stored as the duplicate instruction.

7. The processor of claim 4, wherein the decoding unit is configured to decode the original instruction to thereby access a register of an $m^{th}$ index of the original register file, and to decode the duplicate instruction to thereby access a register of an $m^{th}$ index of the duplicate register file.

16

8. The processor of claim 1, further comprising:
a duplicate program counter, wherein the processor is configured to
duplicate a count value, corresponding to the original instruction, of an original program counter to the duplicate program counter, and
change the count value in the duplicate program counter in response to the duplicate instruction being processed by the instruction pipeline, wherein
the comparing unit is configured to compare a first count value of the original program counter with a first count value of the duplicate program counter, and to output the error detection signal based on the comparison of the first count value of the original program counter with the first count value of the duplicate program counter.

9. The processor of claim 1, further comprising a duplication control unit configured to generate a control signal based on which the instruction pipeline is configured to process the duplicate instruction.

10. The processor of claim 9, wherein the duplication control unit is configured to, based on a second original instruction comprising a store instruction, generate a load instruction, corresponding to the store instruction, as a second duplicate instruction, and
wherein the duplication control unit is configured to store an execution result of the second duplicate instruction in a register of an $n^{th}$ index of an original register file in which an execution result of the second original instruction is stored.

11. A method of detecting a soft error, the method comprising:
executing an original instruction in an instruction pipeline of a processor;
storing an execution result of the original instruction in a register of $n^{th}$ index of an original register file of the processor;
duplicating the original instruction as a duplicate instruction;
executing the duplicate instruction in the instruction pipeline;
storing an execution result of the duplicate instruction in a register of an $n^{th}$ index of a duplicate register file of the processor;
comparing a first value of the register of the $n^{th}$ index of the original register file with a second value of the register of the $n^{th}$ index of the duplicate register file; and
based on the comparison between the first value and the second value, outputting an error detection signal indicative of a presence of a soft error in execution of the original instruction.

12. The method of claim 11, comprising duplicating the original instruction while executing the original instruction in the instruction pipeline.

13. The method of claim 11, wherein duplicating the original instruction as the duplicate instruction comprises;
fetching the original instruction, corresponding to a count value of an original program counter, from an instruction memory; and
storing the original instruction as the duplicate instruction.

14. The method of claim 11, comprising:
based on a second original instruction comprising a store instruction, generating a load instruction, corresponding to the store instruction, as a second duplicate instruction; and storing an execution result of the second duplicate instruction in a register of an $n^{th}$ index of an original register file in which an execution result of the second original instruction is stored.

15. The method of claim 11, wherein:

executing the original instruction comprises decoding the original instruction to access a register of an $m^{th}$ index of the original register file, and executing the duplicate instruction comprises decoding the duplicate instruction to access a register of an $m^{th}$ index of the duplicate register file.

16. The method of claim 11, wherein comparing the first and second values of the registers of the $n^{th}$ index of the original register file and the duplicate register file is performed based on the original instruction being a store instruction.

17. The method of claim 11, further comprising:

changing a first count value of an original program counter, wherein the first count value corresponds to the original instruction, and maintaining a second count value of a duplicate program counter, wherein the second count value corresponds to the duplicate instruction, while executing the original instruction; and changing the second count value of the duplicate program counter and maintaining the first count value of the original program counter while executing the duplicate instruction.

18. The method of claim 11, further comprising:

duplicating a first count value of an original program counter, wherein the first count value corresponds to the original instruction, as a second count value of a duplicate program counter;

changing the second count value of the duplicate program counter while executing the duplicate instruction; and comparing the first count value of the original program counter with the second count value of the duplicate program counter.

19. The method of claim 18, wherein comparing the first and second values of the registers of the $n^{th}$ index of the original register file and the duplicate register file and comparing the first count value of the original program counter with the second count value of the duplicate program counter are performed in different instruction cycles.

20. A processor comprising at least two cores, wherein each of the at least two cores comprises:

an instruction pipeline comprising a plurality of stages, wherein the instruction pipeline is configured to process an original instruction in the plurality of stages in a first instruction cycle, and to process a duplicate instruction in the plurality of stages in a second instruction cycle immediately following the first instruction cycle;

an original register file comprising a plurality of registers, wherein the instruction pipeline is configured to temporarily store an execution result of the original instruction in the original register file;

an original program counter, wherein the processor is configured to change a value of the original program counter in the first instruction cycle and to maintain the value of the original program counter in the second instruction cycle;

a duplicate register file comprising a same number of registers as the original register file, wherein the instruction pipeline is configured to temporarily store an execution result of the duplicate instruction in the duplicate register file;

a duplicate program counter, wherein the processor is configured to change a value of the duplicate program counter in the second instruction cycle and to maintain the value of the duplicate program counter in a third instruction cycle immediately following the second instruction cycle; and a comparing unit configured to compare values of registers of a same index in (i) the original register file and the duplicate register file or (ii) the original program counter and the duplicate program counter, and to, based on the comparison, output an error detection signal indicative of a presence of a soft error in execution of the original instruction.

* * * * *